Figure 1:
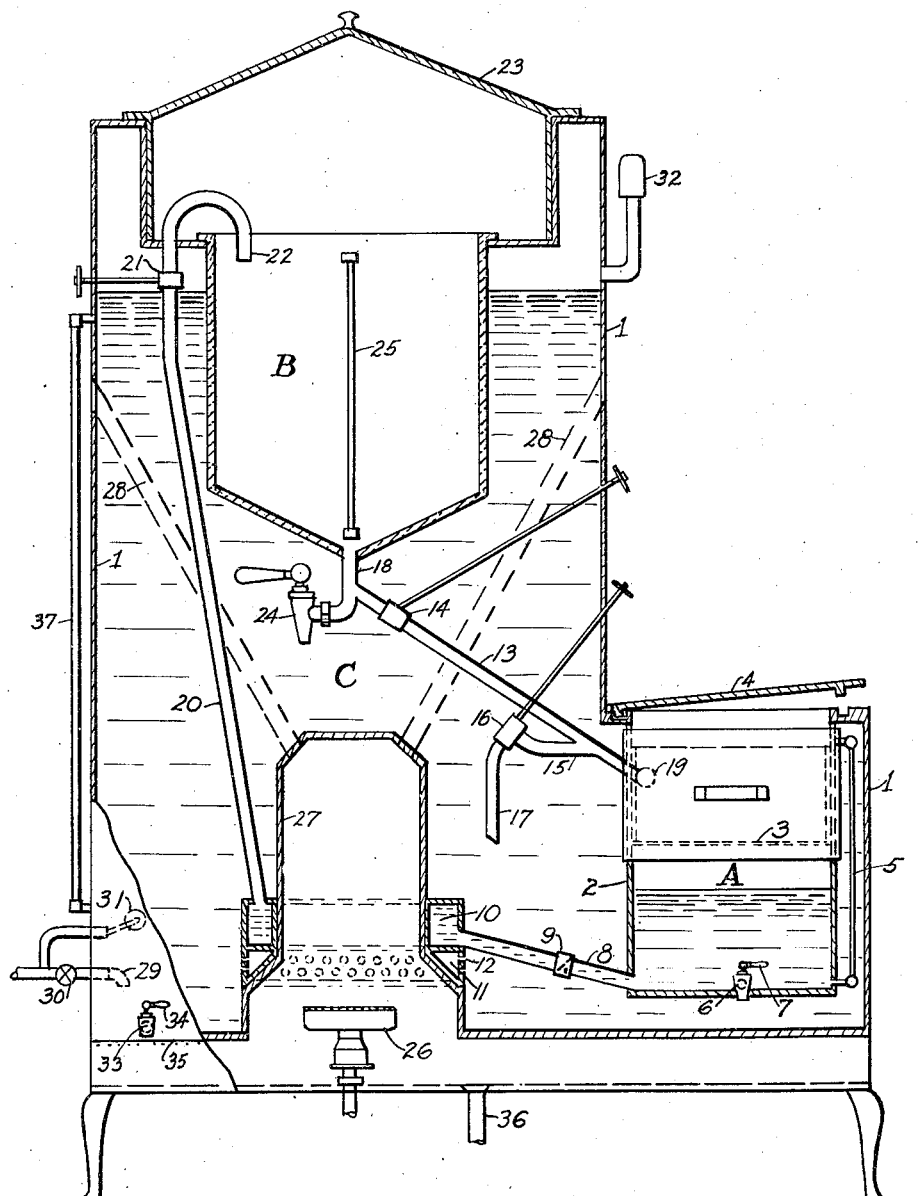

Jan. 2, 1945.  M. CAVICCHIOLI  2,366,384

COFFEE MAKING APPARATUS

Filed April 24, 1944

INVENTOR.
MARIO CAVICCHIOLI
BY Edward T. Kruglak

Patented Jan. 2, 1945

2,366,384

UNITED STATES PATENT OFFICE 2,366,384

COFFEE-MAKING APPARATUS

Mario Cavicchioli, New York, N. Y.

Application April 24, 1944, Serial No. 532,523

6 Claims. (Cl. 99—290)

This invention relates to new and useful improvements in coffee making apparatus.

In the typical coffee maker, the boiling water is manually poured through the coffee grindings contained in a filter bag. The weak coffee extract is then manually drawn off and repoured through the grindings. This is a time consuming and hazardous operation since the danger of scalding is always present.

Devices have been made to provide automatic recirculation of the weak coffee through the grindings, but such devices have proven expensive, difficult to maintain and faulty in operation. Such devices invariably use a separate water or steam operated aspirator, or a suction pump, or a separate water jacket to condense steam in the storage urn to create the suction necessary for their operation.

An object of this invention is to provide for the automatic spraying of boiling water through the coffee grindings by convection.

A further object of the invention is to provide for the automatic recirculation of weak coffee extract until it reaches the desired strength by gravity flow and convection.

In the drawing forming part of this specification, the single figure is a sectional and principally diagrammatic view illustrating a complete coffee making assembly.

Referring to the drawing, one form of the invention shown combines as a unit, coffee maker A, coffee storage container B, disposed except for their covers, within a low-pressure water boiler C, which also acts as a water jacket for the said coffee maker, and said coffee storage container.

The coffee maker A consists of a container 2, perforated drawer 3, tight fitting cover 4, depth gauge 5, drainpipe 6 with cock 7. Pipe 8 provided with check valve 9 leads upward from the bottom of container 2 to annular chamber 10. Said chamber is provided with a double bottom portion 11 containing perforations 12 around the lower periphery. Pipe 13 provided with valve 14 is connected by pipe 15 to valve 16, said valve having a tail pipe 17. The upper end of pipe 13 connects to pipe 18 leading from the bottom of coffee storage container B, the lower end of said pipe 13 connects to a perforated pipe 19 located inside the upper portion of container 2 of coffee maker A, and running its full length. Pipe 20, provided with valve 21 connects to the upper part of said annular chamber 10, and extends upwardly terminating at end 22 in the inside upper part of container B.

Coffee storage container B is provided with a tight-fitting cover 23, a dispensing valve 24 connected to the end of pipe 18, and a gauge 25.

Low pressure water boiler C is provided at its bottom with burner 26 located in combustion housing 27, flues 28 lead from the top of said housing and exhaust to the atmosphere, a cold water supply pipe 29 connects through valve 30 and float valve 31, a steam pressure safety valve 32 is provided, and drain pipe 33 with cock 34 extends from said boiler C over a grilled coffee drip-collecting apron 35 which extends across the front of the apparatus, said apron 35 being provided with drain pipe 36. A gage 37 shows boiler water.

In making coffee with the apparatus shown in the figure, valves 14, 16 and 21 are closed and the water in the boiler is brought to a boil. Drawer 3 is pulled out of coffee maker A and the required amount of grindings placed therein. Valve 16 is then opened and boiling water is drawn by convection into pipe 17 and through pipes 15 and 13 to perforated pipe 19 through which it is sprayed over the coffee grindings in drawer 3. When gauge 5 indicates that container 2 is filled, valve 16 is closed and valve 21 is opened. The coffee extract which flowed from container 2 into annular chamber 10 due to the pressure head, and which was heated in said annular chamber 10, is forced upwardly by convection through pipe 20 into coffee storage container B. When gauge 25 indicates that the said container is full, valve 21 is closed. Coffee storage container B and coffee maker container 2 can be made equal in volume so that one exactly empties into the other.

If it is desired to strengthen the coffee extract, valve 14 is opened and the contents of coffee storage container B flows through pipes 18 and 13 to perforated pipe 19 through which it is sprayed over the coffee grindings in drawer 3. Valve 14 is then closed and valve 21 is opened and the strengthened coffee extract is returned to the coffee storage container in the manner previously described. The contents of coffee storage container B is kept hot by the water jacketing of the water in boiler C, and is dispensed as required through valve 24.

A second batch of coffee may be made in coffee maker A, and be ready for instant transfer to the coffee storage container B, in the manner previously described.

The apparatus is easily kept in a sanitary condition. The spent coffee grindings are removed by pulling out drawer 3, boiling water is sprayed over the drawer and into the container through perforated pipe 19, cover 4 is opened to scrub the inside of the coffee maker, and the wash contents are drained out through cock 7 into drip apron 35, and drained through pipe 36. The coffee drip apron 35 is cleaned by boiling water obtained from cock 34. The said cock 34 is also used to drain out the low pressure water boiler C, the contents going into drip apron 35, and out through drain pipe 36.

The invention is not limited to any particular physical embodiment, but on the contrary is susceptible of being expressed in different structures and forms and certain of its features may be employed to the exclusion of others in view of the appended claims.

What is claimed is:

1. A coffee making apparatus comprising a low-pressure water boiler, a coffee storage container partially disposed inside said boiler so as to be jacketed by the water therein, said coffee storage container having an airtight cover accessible from the outside, and provided with a valve for the withdrawal of coffee; a coffee maker container partially disposed inside said boiler so as to be jacketed by the water therein, said coffee maker container having an airtight cover accessible from outside, and a coffee grindings receiving perforated drawer, accessible from the outside, in the upper part of said coffee maker container, a chamber disposed within said boiler and adapted to be heated, a downwardly extending check valve-controlled pipe leading from the bottom of said chamber to the lower portion of said coffee maker container, an upwardly extending valve-controlled pipe leading from the top of said chamber to the upper part of said coffee storage container, a downwardly extending valve-controlled pipe leading from the bottom of said coffee storage container to the upper inside portion of said coffee maker container.

2. A structure as specified in claim 1 in combination with a valve controlled pipe extending downwardly inside said boiler from said pipe last mentioned in claim 1.

3. A structure as specified in claim 1 in which the chamber is annular in form and having a double bottom portion, the lower portion having perforations along its periphery.

4. An urn for coffee serving consisting of a low pressure water boiler, a coffee storage container partially disposed inside said boiler so as to be jacketed by the water therein, said coffee storage container having an airtight cover and provided with a valve for the withdrawal of coffee, a chamber disposed within said boiler and adapted to be heated, a downwardly extending check valve-controlled pipe leading from the bottom of said chamber to a source of coffee extract, and an upwardly extending valve-controlled pipe leading from the top of said chamber to the upper part of said coffee storage container.

5. A structure as specified in claim 4 in which the chamber is annular in form and having a double bottom portion, the lower portion having perforations along its periphery.

6. A structure as specified in claim 1 in combination with a valve controlled pipe extending downwardly inside said boiler from said pipe last-mentioned in said claim 1, and in which said structure the chamber is annular in form and having a double bottom portion, the lower portion having perforations along its periphery.

MARIO CAVICCHIOLI.